US008733325B2

(12) United States Patent
Takamatsu

(10) Patent No.: US 8,733,325 B2
(45) Date of Patent: May 27, 2014

(54) EVAPORATED FUEL TREATING DEVICE

(75) Inventor: Hiroshi Takamatsu, Chiryu (JP)

(73) Assignee: Aisan Kogyo Kabushiki Kaisha, Aichi-Ken (JP)

( * ) Notice: Subject to any disclaimer, the term of this patent is extended or adjusted under 35 U.S.C. 154(b) by 208 days.

(21) Appl. No.: 13/420,310

(22) Filed: Mar. 14, 2012

(65) Prior Publication Data

US 2012/0234301 A1  Sep. 20, 2012

(30) Foreign Application Priority Data

Mar. 16, 2011  (JP) ................................ 2011-058155

(51) Int. Cl.
*F02M 33/04*  (2006.01)
*F02M 25/08*  (2006.01)
*B60K 15/035* (2006.01)
*F02M 33/02*  (2006.01)

(52) U.S. Cl.
CPC ........... *F02M 25/0854* (2013.01); *F02M 25/08* (2013.01); *B60K 15/03504* (2013.01)
USPC .......................................... 123/519; 123/516

(58) Field of Classification Search
CPC .......................... F02M 25/0854; F02M 25/08
USPC ......... 123/519, 516, 518, 520, 698; 137/493, 137/587–589
See application file for complete search history.

(56) References Cited

U.S. PATENT DOCUMENTS

| 5,634,450 | A | 6/1997 | Hara |
| 7,097,697 | B2 * | 8/2006 | Nakamura et al. ............... 96/134 |
| 2005/0172938 | A1 * | 8/2005 | Uchino et al. ................ 123/519 |
| 2005/0204924 | A1 | 9/2005 | Nakamura |
| 2007/0119306 | A1 * | 5/2007 | Yamada et al. ................. 96/131 |
| 2009/0013973 | A1 | 1/2009 | Yamasaki |
| 2010/0154755 | A1 * | 6/2010 | Ichikawa et al. .............. 123/519 |
| 2010/0180870 | A1 | 7/2010 | Kosugi |
| 2011/0315126 | A1 * | 12/2011 | Yoshida et al. ............... 123/519 |

FOREIGN PATENT DOCUMENTS

| JP | 8-338326    | 12/1996 |
| JP | 2004-060584 | 2/2004  |
| JP | 2008-202604 | 9/2008  |
| JP | 2009-19572  | 1/2009  |
| JP | 2010-144549 | 7/2010  |
| JP | 2010-168908 | 8/2010  |

OTHER PUBLICATIONS

Japanese Office Action dated Feb. 18, 2014 with English translation.

* cited by examiner

*Primary Examiner* — Mahmoud Gimie
(74) *Attorney, Agent, or Firm* — Dickinson Wright PLLC

(57) ABSTRACT

An evaporated fuel treating device includes a chamber, closest to an atmospheric port, divided into first, second, and third compartments by a partition member having a peripheral wall and a separating wall. The first compartment has an adsorbent layer and one end in communication with the third compartment and another end in communication with a tank port. The second compartment communicates with the first compartment through a first communication portion formed at one end of the peripheral wall. One end of the second compartment communicates with the third compartment through a second communication portion provided in the separating wall, while the other end thereof is closed. The airflow resistance of a second filter covering one end of the peripheral wall and one end of the separating wall is higher than the airflow resistance of a first filter covering one end of the adsorbent layer.

4 Claims, 14 Drawing Sheets

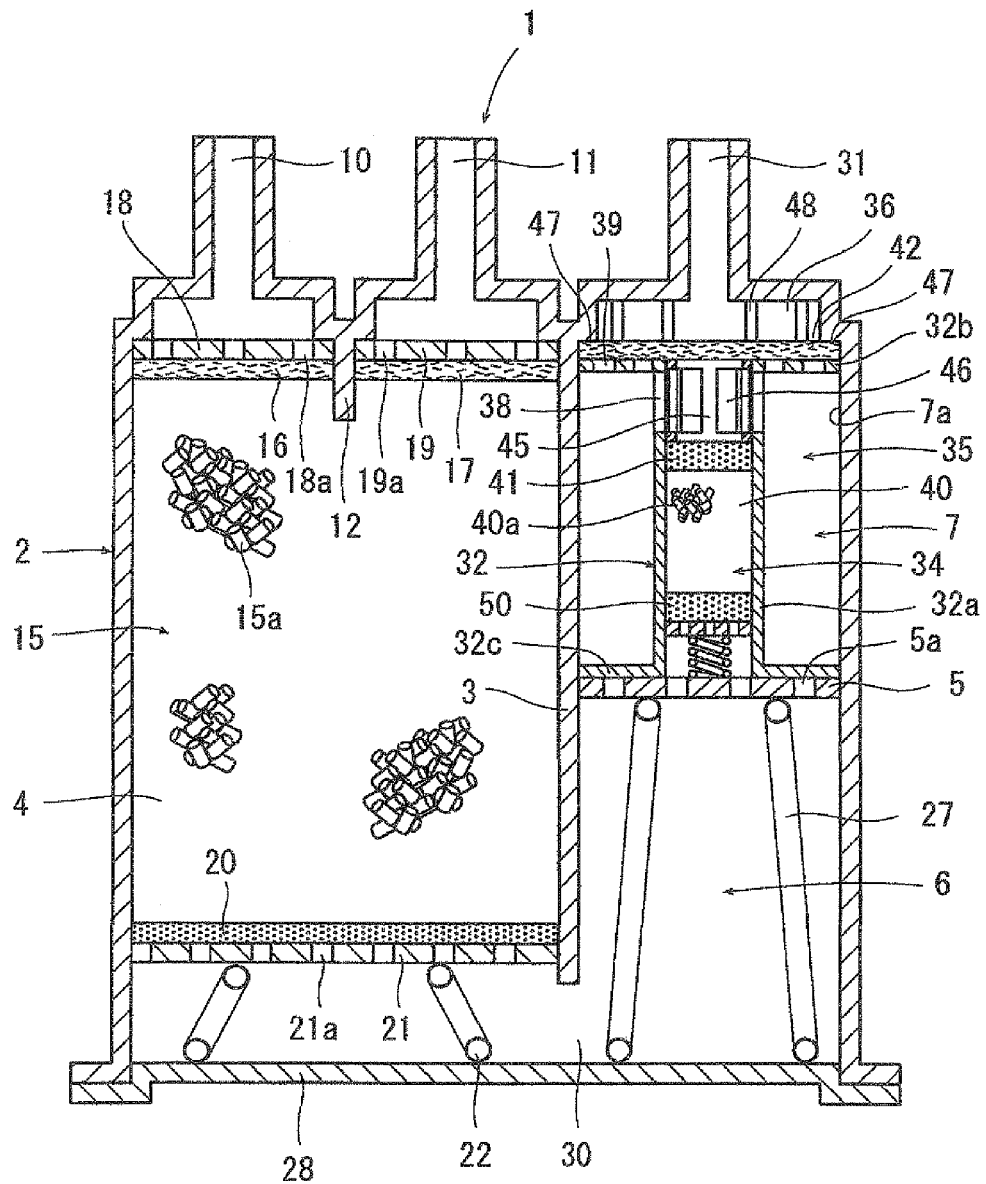

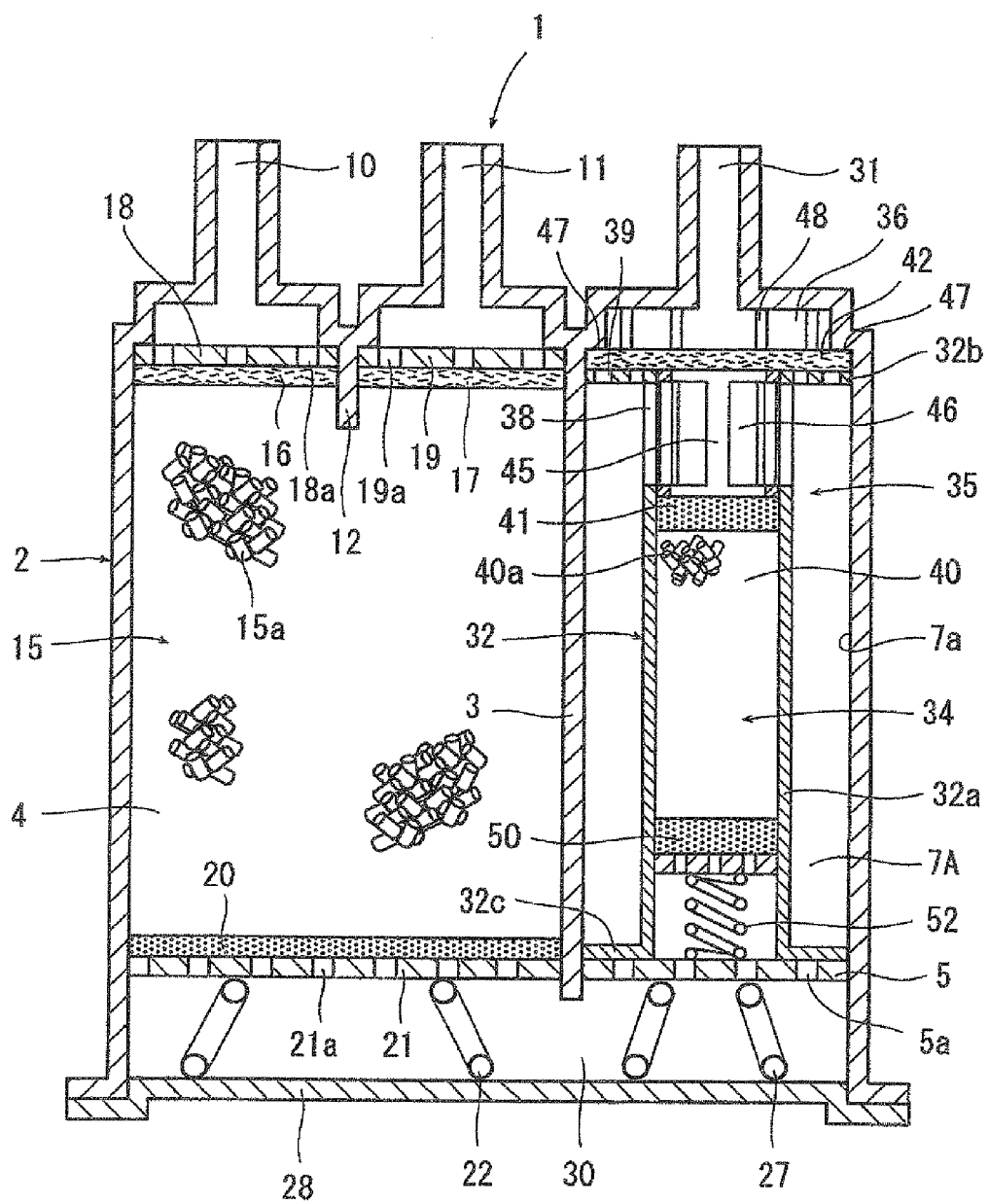

EVAPORATED FUEL TREATING DEVICE

BACKGROUND OF THE INVENTION (1) Field of the Invention

The present invention relates to an evaporated fuel treating device.

(2) Description of Related Art

Hitherto, as an evaporated fuel treating device (hereinafter referred to as the canister) that temporarily adsorbs fuel components in an evaporated fuel so as to restrain the evaporated fuel from being released to the atmosphere from an automotive fuel tank or the like, there has been known a canister 101, which has a case 105 with a tank port 102, a purge port 103 and an atmospheric port 104 formed therein, as illustrated in FIG. 16. The interior of the case 105 is partitioned into a plurality of chambers 106 and 107, and a first adsorbent layer 109 and a second adsorbent layer 110 are formed by filling the chambers 106 and 107 with activated carbon 108. A nonwoven cloth 111 is provided between the second adsorbent layer 110 and the atmospheric port 104 to prevent the fine powder of the activated carbon 108 constituting the second adsorbent layer 110 from leaking out into the atmospheric port 104 (refer to, for example, JP-A-2008-202604 and JP-A-2004-60584).

Recently, in the canister, the second adsorbent layer 110 positioned most closely to the atmospheric port 104 has been formed such that an increased ratio L/D between a vertical length L in FIG. 16 and a diameter D of a cross-section in FIG. 16 is obtained thereby to reduce the amount of an evaporated fuel emitted to the atmosphere.

The aforesaid conventional canister 101 is formed such that the transverse sectional area of the second adsorbent layer 110 is substantially equal to the surface area of the nonwoven cloth 111. Therefore, with the reduction of the transverse section area of the second adsorbent layer 110 in order to increase the L/D ratio, the surface area of the nonwoven cloth 111 would be decreased. As illustrated in FIG. 17, however, the pressure loss in the nonwoven cloth 111 at the same flow rate increases as the surface area decreases. This poses a problem that reducing the transverse section area of the second adsorbent layer 110 to increase the L/D ratio inconveniently leads to deteriorate refueling performance.

BRIEF SUMMARY OF THE INVENTION

Accordingly, an object of the present invention is to provide an evaporated fuel treating device capable of solving the problem described above.

To solve this problem, in accordance with the present invention, there is provided an evaporated fuel treating device which has a case provided with an atmospheric port, the case having at least one partitioned chamber therein, wherein a chamber closest to the atmospheric port includes a partition member having a peripheral wall which serves as a partition to provide a first compartment on an inner side and a second compartment on an outer side and a separating wall which serves as a partition between the second compartment and a third compartment, the third compartment being formed between the separating wall and the atmospheric port;

an adsorbent layer formed by filling adsorbent material is provided in the first compartment, one end of the first compartment being in communication with the third compartment, while the other end thereof being in communication with a tank port side, thus allowing a fluid to flow across between both ends of the first compartment through the adsorbent layer, the second compartment is in communication with the first compartment at a first communication portion formed in the peripheral wall on the atmospheric port side, one end of the second compartment being in communication with the third compartment through a second communication portion provided in the separating wall, while the other end of the second compartment being closed, and a first filter covering an end of the adsorbent layer adjacent to the atmospheric port is installed, a second filter covering an end of the peripheral wall adjacent to the atmospheric port and an end of the separating wall adjacent to the atmospheric port being installed, and an airflow resistance of the second filter being set to be higher than an airflow resistance of the first filter.

In the present invention, the cross-section area of the first compartment may be formed to become smaller toward the atmospheric port.

In the present invention, side walls forming the second communication portion may be formed in a grid-like pattern.

According to the present invention, with the structure that the chamber closest to the atmospheric port is divided by the partition member having a peripheral wall which serves as a partition to provide the first compartment on the inner side and the second compartment on the outer side and the separating wall which serves as a partition to provide the second compartment and the third compartment, the first compartment is provided with the adsorbent layer, and the second filter covering the end of the peripheral wall adjacent to the atmospheric port and an end of the separating wall adjacent to the atmospheric port is installed, the diameter of the second filter, which is a main filter, can be set to be larger than the diameter of the effective cross-section of the adsorbent layer. This arrangement makes it possible to secure a larger effective cross-section of the main filter (the second filter) so as to restrain the refueling performance from deteriorating even when the effective cross-section diameter D of the adsorbent layer is reduced to increase the ratio L/D between the length L and the effective cross-section diameter D of the adsorbent layer.

Further, forming the cross-section area of the first compartment to become smaller toward the atmospheric port makes it possible to further increase the L/D ratio of a portion in the adsorbent layer provided in the first chamber, the portion being adjacent to the atmospheric port. This permits a further reduction in the amount of an evaporated fuel emitted into the atmosphere.

BRIEF DESCRIPTION OF SEVERAL VIEWS OF THE DRAWING

FIG. 8 is a diagram schematically illustrating a construction of an example of an evaporated fuel treating device according to Embodiment 2 of the present invention;

FIG. 9 is a diagram schematically illustrating a construction of another example of the evaporated fuel treating device according to Embodiment 2 of the present invention;

DETAILED DESCRIPTION OF THE INVENTION

Embodiments for carrying out the present invention will now be described with reference to the accompanying drawings.

Embodiment 1

FIGS. 1 to 7B illustrate Embodiment 1 according to the present invention.

Figure 1:
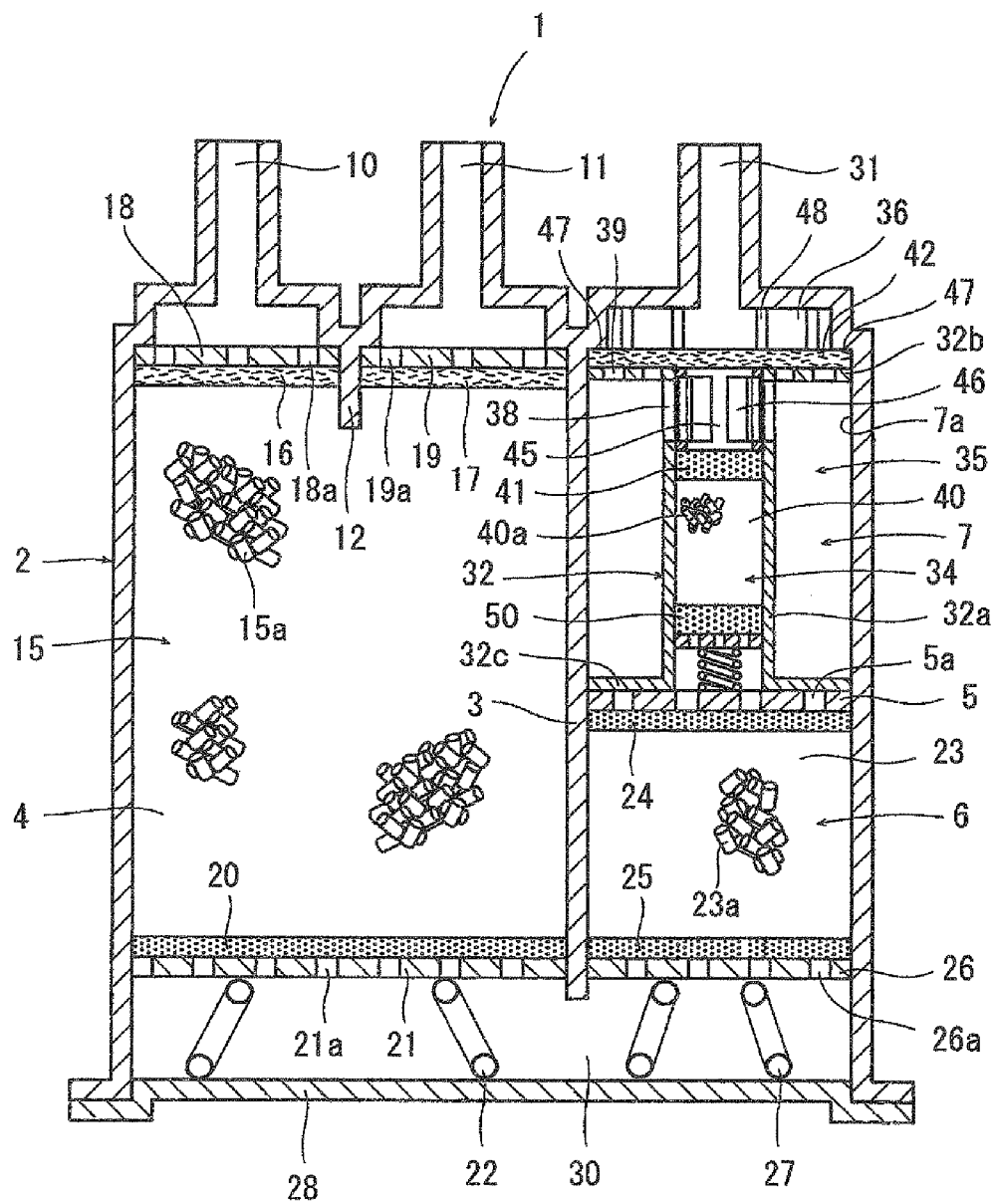
FIG. 1 is a diagram schematically illustrating a construction of an evaporated fuel treating device according to Embodiment 1 of the present invention.

FIG. 1 is a diagram schematically illustrating an evaporated fuel treating device 1. The evaporated fuel treating device 1 has a case 2. In the following description, the upper end in FIG. 1 will be defined as the top, the lower end will be defined as the bottom, and the direction orthogonal to the vertical direction will be defined as a horizontal direction.

The case 2 has therein a partition wall 3 vertically arranged downward from the upper end of the case 2. The interior of the case 2 is partitioned by the partition wall 3 into two spaces in the horizontal direction, the two spaces being in communication through a space 30 under the lower end of the partition wall 3. Further, the left space in FIG. 1 constitutes a first chamber 4, and the right space in FIG. 1 is divided into two compartments in the vertical direction by a plate 5 arranged in the horizontal direction, the lower chamber being a second chamber 6 while the upper chamber being a third chamber 7. The plate 5 is provided with many through holes 5a, and the second chamber 6 and the third chamber 7 are in communication through the through holes 5a.

The first chamber 4 is in communication with a tank port 10 provided at the top of the case 2, and the tank port 10 is in communication with an upper air chamber of a fuel tank through a valve, which is not shown. Further, the first chamber 4 is also in communication with a purge port 11 provided at the top of the case 2, and the purge port 11 is connected to an air intake passage of an engine through a purge control valve (VSV) and a purge passage, which are not shown. The opening degree of the purge control valve is controlled by an electronic control unit (ECU) and the purge control is carried out while the engine is in operation. Provided between the tank port 10 and the purge port 11 in the case 2 is a partition wall 12 extendedly provided from the upper end of the case 2 into the upper portion of a first adsorbent layer 15, which will be discussed hereinafter. The partition wall 12 guides a fluid flowing between the tank port 10 and the purge port 11 to run through the first adsorbent layer 15, which will be discussed later.

Provided in the first chamber 4 is the first adsorbent layer 15 formed by filling activated carbon 15a, which is an adsorbent, at a predetermined density. The activated carbon 15a constituting the first adsorbent layer 15 is formed of granulated carbon having a predetermined average particle diameter. The activated carbon 15a may be formed of crushed carbon.

A portion of the upper surface of the first adsorbent layer 15 that is adjacent to the tank port 10 is covered with a nonwoven cloth 16 and a portion thereof that is adjacent to the purge port 11 is covered with a nonwoven cloth 17. A plate 18 having many communication holes 18a is provided on the portion of the nonwoven cloth 16 that is adjacent to the tank port 10, while a plate 19 having many communication holes 19a is provided on the portion of the nonwoven cloth 17 that is adjacent to the purge port 11.

Further, the lower surface of the first adsorbent layer 15 is provided with a filter 20 covering the entire lower surface, the filter 20 being composed of urethane or the like. Under the filter 20 is provided a plate 21 having many communication holes 21a. The plate 21 is urged upward by an urging means 22, such as a spring.

The second chamber 6 has therein a second adsorbent layer 23 formed by filling activated carbon 23a, which is an adsorbent material, at a predetermined density, as illustrated in FIG. 1. The activated carbon 23a constituting the second adsorbent layer 23 is the same as the activated carbon 15a constituting the first adsorbent layer 15.

Further, over the second adsorbent layer 23 is provided a filter 24 that covers the entire upper surface thereof, the filter 24 being composed of urethane or the like. Under the second adsorbent layer 23 is provided a filter 25 that covers the entire lower surface thereof, the filter 25 being composed of urethane or the like. Under the filter 25 is provided a plate 26 having many communication holes 26a. The plate 26 is urged upward by an urging means 27, such as a spring.

The first chamber 4 and the second chamber 6 are in communication through the space 30 between the plates 21, 26 and the bottom plate 28 of the case 2.

The third chamber 7 is in communication with an atmospheric port (atmospheric aperture) 31 provided at the top of the case 2, and the atmospheric port 31 is in communication with the atmosphere. A partition member 32 is provided in the third chamber 7. The partition member 32 divides the interior of the third chamber 7 into a first compartment 34, a second compartment 35, and a third compartment 36.

As illustrated in FIGS. 2 to 5, the partition member 32 is constructed of a cylindrical peripheral wall 32a and a flange-shaped first separating wall 32b and a flange-shaped second separating wall 32c that extend outward from the peripheral wall 32a in the horizontal direction (the radial direction) at both ends of the peripheral wall 32a in the direction of an axis X-X.

Figure 2:
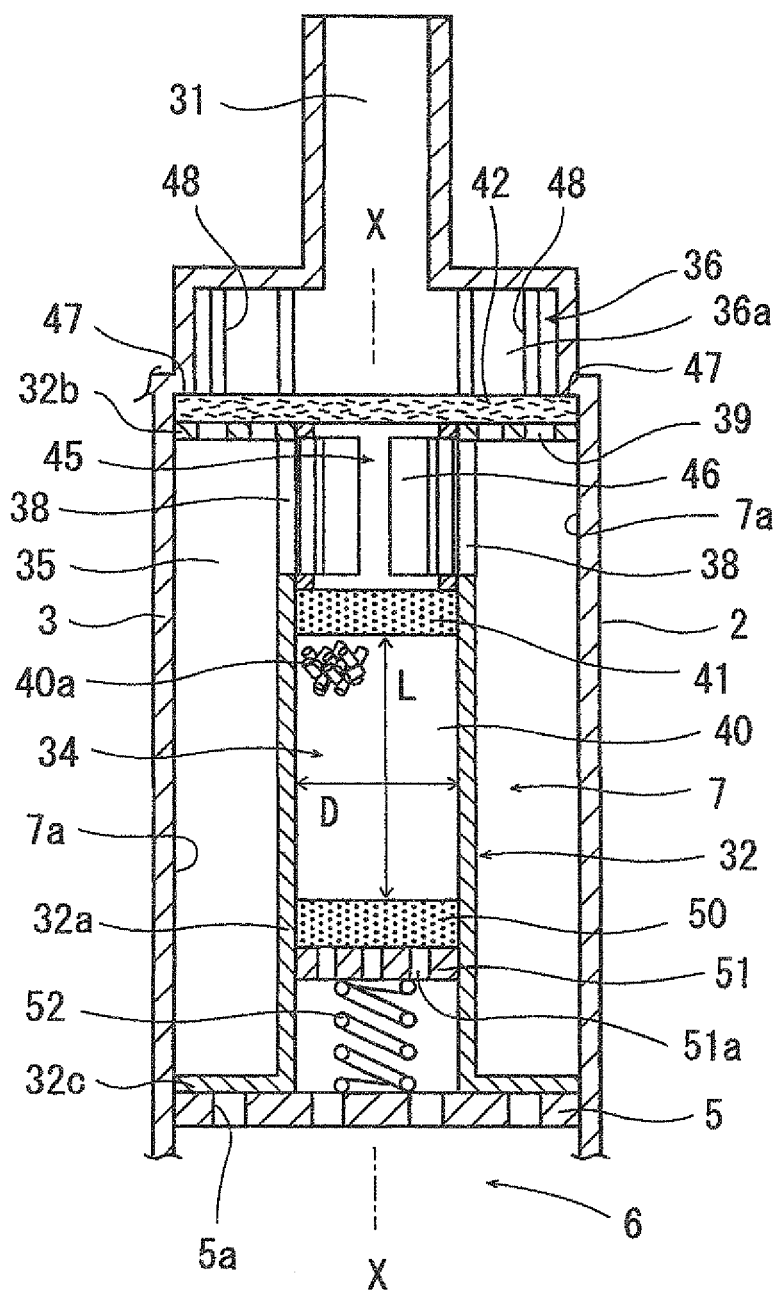
FIG. 2 is a partly enlarged view of FIG. 1.
Figure 3:
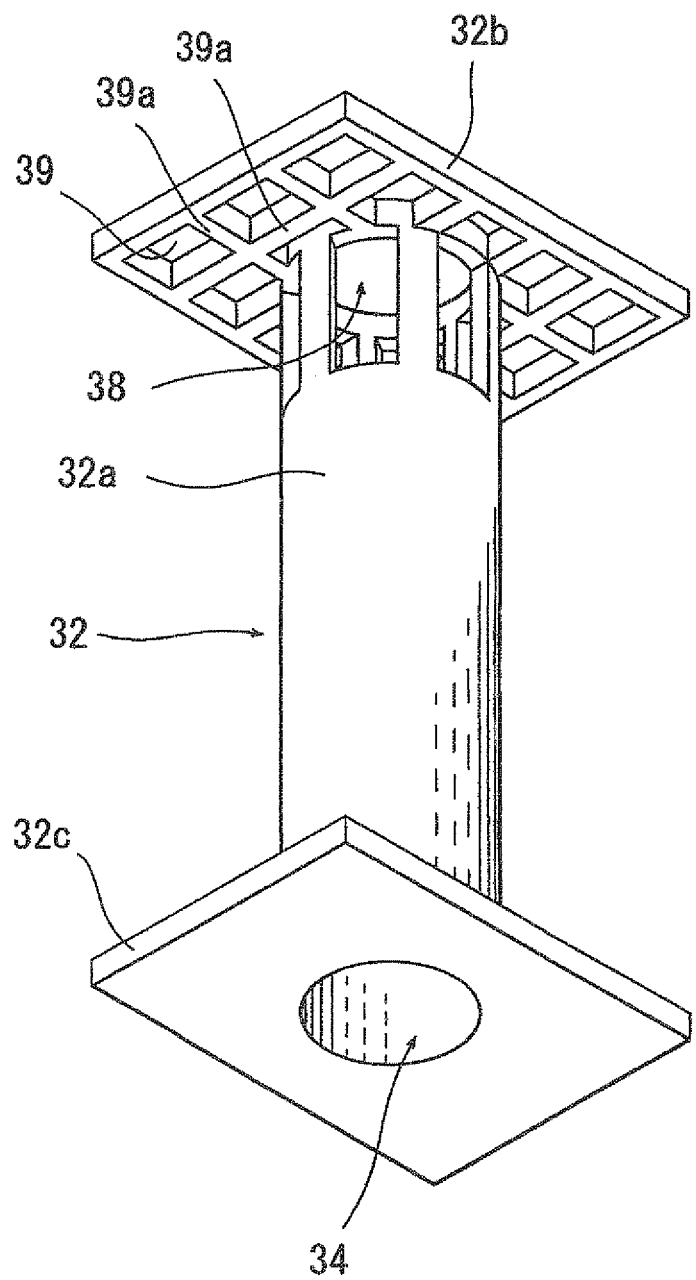
FIG. 3 is a perspective view of a partition member used in Embodiment 1 of the present invention.
Figure 4:
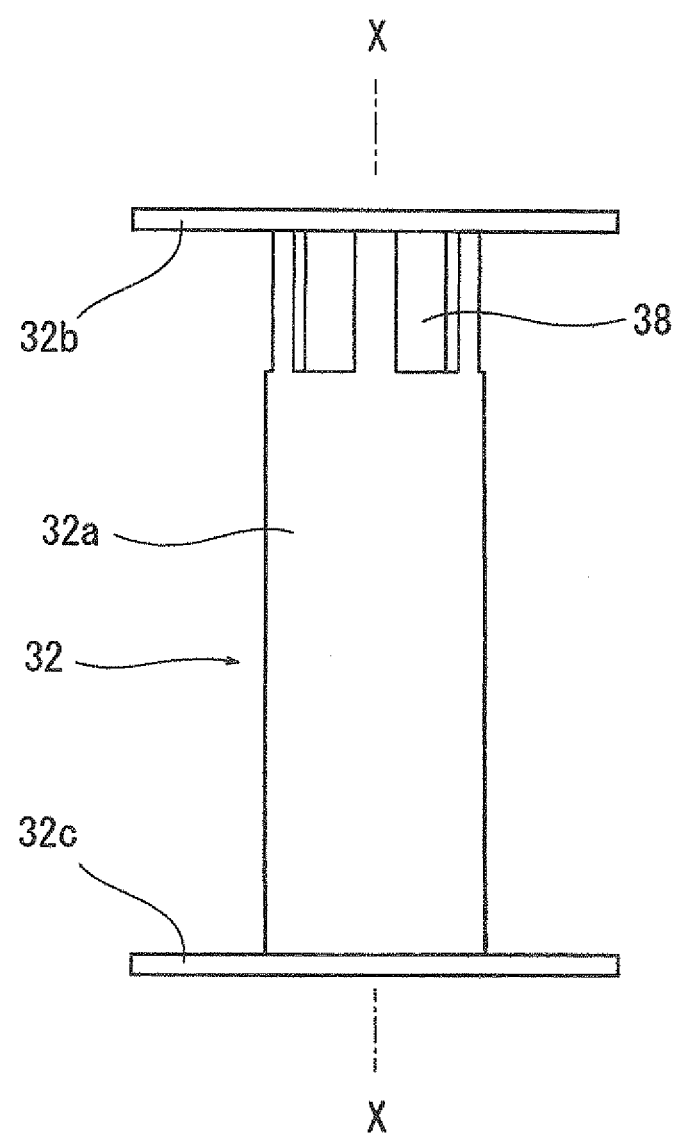
FIG. 4 is a front view of the partition member shown in FIG. 3.

As illustrated in FIGS. 3 and 4, the peripheral wall 32a is formed like a hollow cylinder, its cross-section orthogonal to the axis X-X being circular and the inside diameter thereof being substantially the same over the entire axis X-X. The hollow body is open at both ends in the direction of the axis X-X. The peripheral wall 32a is formed such that the axis X-X lies substantially at the same position as the central axis in the vertical direction of the third chamber 7. In a portion of the peripheral wall 32a that is adjacent to the atmospheric port 31 are provided a plurality of first communication portions 38 which penetrate inward and outward of the peripheral wall and which are arranged at appropriate intervals in the circumferential direction about the axis X-X of the peripheral wall 32a. The number, the length in the direction of the axis X-X, and the width in the circumferential direction of the first communication portions 38 are not limited to those illustrated in FIGS. 2 to 5, and may be arbitrarily set according to the properties or the like of the evaporated fuel treating device 1. In the following description, the end adjacent to the atmospheric port 31 (upper end) will be defined as one end, while the opposite end (lower end) therefrom will be defined as the other end.

Figure 5:
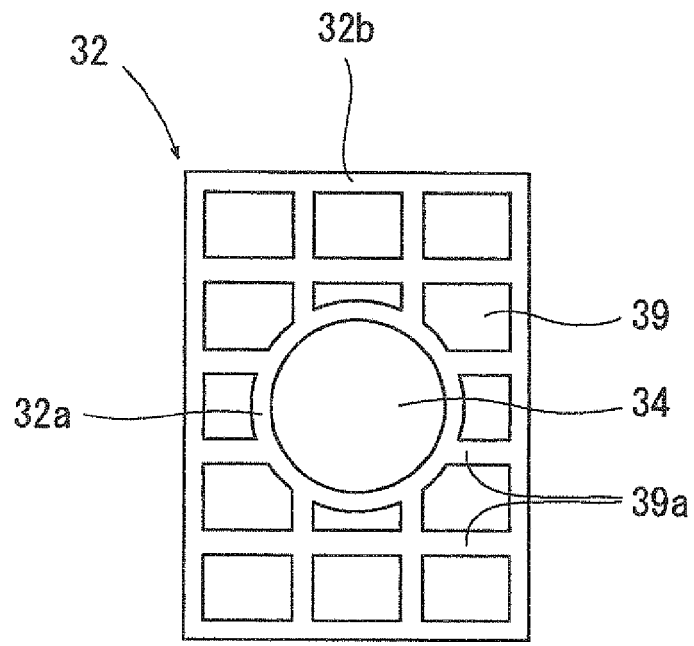
FIG. 5 is a top view of the partition member shown in FIG. 3.

The first separating wall 32b at one end of the peripheral wall 32a is shaped like a plate with the outer peripheral surface thereof being formed to be fitted in and abutted against an inner surface 7a of the third chamber 7. The first separating wall 32b has many through holes, which are second communication portions 39. The second communication portions 39 may have an arbitrary shape. In the present embodiment, side walls 39a of the second communication portions 39 are formed like grids to constitute the second communication portions 39, as illustrated in FIGS. 3 and 5. The second separating wall 32c at the other end of the peripheral wall 32a is shaped like a plate with no hole therein, the outer peripheral surface thereof being formed to be fitted in and abutted against the inner surface 7a of the third chamber 7.

As illustrated in FIG. 2, the partition member 32 is disposed in the third chamber 7 so as to form the first compartment 34 inside the peripheral wall 32a, the second compartment 35 between the outer side of the peripheral wall 32a and the partition wall 3 of the case 2, and the third compartment 36 between the first separating wall 32b and the atmospheric port 31. The first compartment 34 and the second compartment 35 are divided by the peripheral wall 32a, and the first compartment 34 and the second compartment 35 are in communication through the first communication portions 38. Further, the second compartment 35 and the third compartment 36 are divided by the first separating wall 32b and are in communication through the second communication portions 39. The first compartment 34 and the third compartment 36 are in communication through the openings at one end of the peripheral wall 32a. The other end of the second compartment 35 is closed by the second separating wall 32c and not in communication with other spaces.

As illustrated in FIG. 2, provided in the first compartment 34 is a third adsorbent layer 40, which is positioned in the middle in the direction of the axis X-X, which extends from the other end of the first communication portions 38 to the other farther end, and which is formed by filling activated carbon 40a, which is an adsorbent material, at a predetermined density. The same material as the activated carbon 15a constituting the first adsorbent layer 15 may be used for the activated carbon 40a constituting the third adsorbent layer 40.

The entire surface of one end (adjacent to the atmospheric port 31) of the third adsorbent layer 40 is covered with a first filter (pre-filter) 41. The first filter 41 is disposed such that one end surface thereof is positioned at the other farther end than the other end of the first communication portions 38, as illustrated in FIG. 2. The first filter 41 may be formed of any material, such as urethane or nonwoven cloth, as long as it is capable of holding the activated carbon 40a well enough to prevent it from spilling out. In the present embodiment, an ester-based continuous foamed polyurethane material having a thickness of 15 mm or less has been used. Preferably, the first filter 41 has an airflow resistance that is set to be lower than the airflow resistance of a second filter (main filter) 42, which will be discussed later, and has an airflow resistance of 20 to 60 Pa at an air flow velocity of 2 m/sec.

On one end of the first filter 41 in the peripheral wall 32a is provided a retaining member 45, which is intruded thereinto. The retaining member 45 is disposed such that the surface of one end thereof is substantially flush with the surface of one end of the first separating wall 32b.

Figure 6:
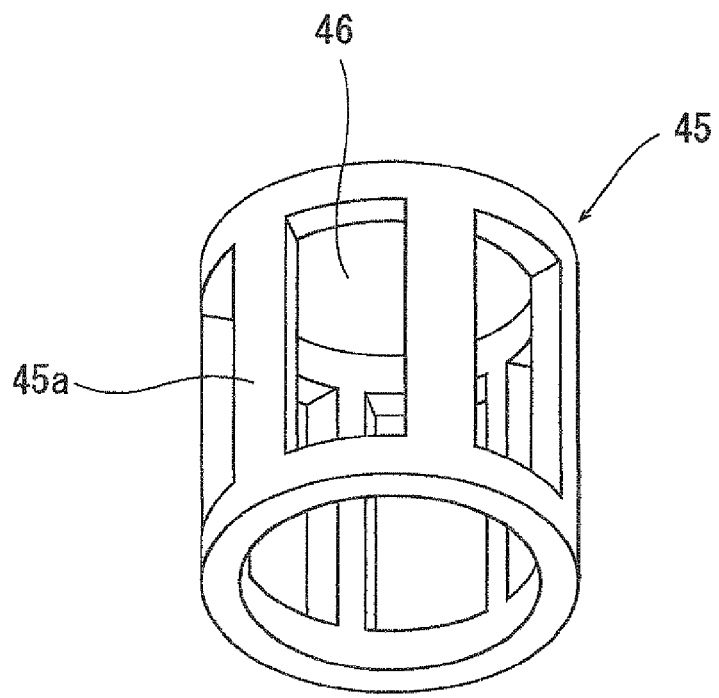
FIG. 6 is a perspective view of a retaining member used in Embodiment 1 of the present invention.
Figure 7A:
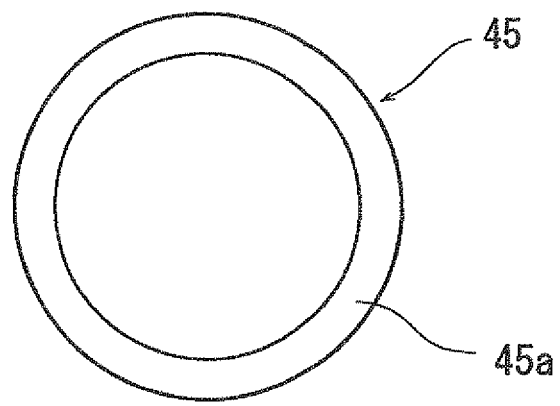
FIG. 7A is a top view of the retaining member shown in FIG. 6.
Figure 7B:
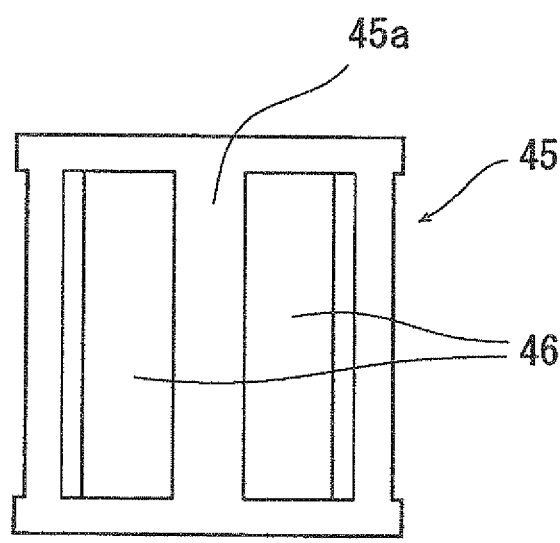
FIG. 7B is a front view of the retaining member shown in FIG. 6.

The retaining member 45 has a cylindrical shape, as illustrated in FIGS. 6, 7A and 7B, and the outside diameter thereof is set to be identical to or slightly smaller than the inside diameter of the peripheral wall 32a of the partition member 32. The retaining member 45 has through holes 46 formed on a side wall 45a at appropriate intervals in the circumferential direction. The number, the length in the axial direction, the width in the circumferential direction, and the positions of the through holes 46 may be arbitrarily set as long as the through holes 46 are in communication with the first communication portions 38 and the inner side of the retaining member 45 and outer side of the peripheral wall 32a of the partition member 32 are in communication. In the present embodiment, the number of the through holes 46 is set to the same as the number of the first communication portions 38, and the through holes 46 are provided such that the positions thereof correspond to the positions of the first communication portions 38.

A mounting portion 47 that juts out inwards from the inner surface 7a of the third chamber 7 is provided at the portion in the third chamber 7 closer to the atmospheric port 31 than one end of the partition member 32, over the entire circumference about the axis X-X. The second filter (main filter) 42 is provided on one end of the retaining member 45 and one end of the first separating wall 32b such that the second filter 42 covers the entire one end surface of the retaining member 45 and the entire one end surface of the first separating wall 32b. The outer edge of the one end surface of the second filter 42 is fixed to the other end surface of the mounting portion 47 by welding or the like. As the second filter 42, any filter made of urethane, nonwoven cloth or the like may be used as long as it is capable of restraining fine powder of the activated carbon 40a constituting the third adsorbent layer 40 from leaking out to the atmosphere through the atmospheric port (at one end). The present embodiment uses, as the second filter 42, a filter of a nonwoven cloth which is made of fibers of polyester and rayon and which is 8 mm thick or less. Preferably, the second filter 42 has an airflow resistance that is set to be higher than the airflow resistance of the first filter 41, and has an airflow resistance of 20 to 60 Pa at an air flow velocity of 20 cm/sec.

In the third compartment 36, a plurality of space adjusting members 48 that protrude downward from the upper wall inner surface of the case 2 are provided at appropriate intervals. Each of the space adjusting members 48 is formed into, for example, a columnar shape, and spaces 36a between the space adjusting members 48 and 48 are in communication with each other. A fluid passes through the spaces 36a between the first compartment 34 or the second compartment 35 and the atmospheric port 31.

Each of the space adjusting members 48 is formed at the bottom end to be positioned substantially flush with the other end surface of the mounting portion 47. The space adjusting members 48 hold the partition member 32 in a predetermined position and also set the one end surface of the retaining member 45 and the one end surface the partition member 32 to be substantially flush with each other.

The third adsorbent layer 40 is provided at the other end with a third filter 50 that covers the entire surface thereof. The third filter 50 may be any filter of urethane, nonwoven cloth or the like as long as it is capable of holding the activated carbon 40a well enough to prevent it from spilling out. In the present embodiment, the same filter as the first filter 41 has been used.

The third filter 50 is provided at the other end with a plate 51, which has many through holes 51a. An urging means 52, such as a spring, is provided between the plate 51 and the plate 5 to urge the plate 51 upward.

With the construction described above, the evaporated fuel that has flown through the tank port 10 into the evaporated fuel treating device 1 passes through the first chamber 4, the space 30, the second chamber 6, and the plate 5 and runs into the first compartment 34 of the third chamber 7. During the passage, fuel components are adsorbed by adsorbent layers 15 and 23. Further, the fluid that has flown into the first compartment 34 passes through the third adsorbent layer 40, in which the fuel components are adsorbed by the third adsorbent layer 40, and then flows into the retaining member 45. Thereafter, the fluid passes through the through holes 46 of the retaining member 45, the first communication portions 38 of the peripheral wall 32a, the second compartment 35, the second communication portions 39 and the second filter 42, and/or, from the openings at one ends of the retaining member 45 and the peripheral wall 32a through the second filter 42, into the third compartment 36, and then it is released to the atmosphere through the atmospheric port 31.

Meanwhile, during purge control while the engine is in operation, a purge control valve is released by an electronic control unit (ECU), and the air that has been taken into the evaporated fuel treating device 1 through the atmospheric port 31 by a negative pressure in the air intake passage flows in the opposite direction to the aforesaid direction and is supplied to the air intake passage of the engine from the purge port 11. At that time, the fuel components that have been adsorbed by the activated carbon constituting the adsorbent layers 15, 23 and 40 are desorbed and supplied together with the air into the engine.

The evaporated fuel treating device 1 may be used as illustrated in FIG. 1 in which the atmospheric port 31 is located at the upper side, or may be disposed such that the atmospheric port 31 is oriented in the horizontal direction, that is, the vertical direction in FIG. 1 is replaced by the horizontal direction.

The aforesaid construction and configuration of the evaporated fuel treating device 1 according to the present invention provide the following operations and advantages.

The second filter (main filter) 42 for restraining the fine powder of the activated carbon 40a from leaking out to the atmosphere is shaped to cover the entire surfaces of one end of the retaining member 45 and one end of the first separating wall 32b. That is, since the surface area of the second filter 42 is set to be larger than the area of the cross-section orthogonal to the axis X-X of the third adsorbent layer 40, in order to increase the ratio L/D between the length L and the effective cross-section diameter D of the third absorbent layer 40, it is possible to secure a larger surface area of the second filter 42, thus restraining the refueling performance from deteriorating, even when the cross-section area of the third adsorbent layer 40 is reduced.

Further, since the second compartment 35 which is composed of an air layer is provided around the third adsorbent layer 40, and most fuel components are heavier than air, the heavy fuel components settle out to the bottom of the second compartment 35 and are separated when the fuel components, which have been adsorbed by the adsorbent layer 40, desorb from the fluid. This arrangement makes it possible to restrain the fuel components from leaking out into the atmosphere.

Embodiment 2

In Embodiment 1 described above, three chambers 4, 6 and 7 have been formed in the case 2 and each of the chambers has been provided with the adsorbent layer to construct the evaporated fuel treating device 1. The present invention may be applied to any evaporated fuel treating device as long as the case has at least an atmospheric port, the case has therein at least one chamber in communication with the atmospheric port and the interior of a chamber closest to the atmospheric port is divided into a first compartment 34, a second compartment 35, and a third compartment 36 as with the aforesaid Embodiment 1 by using the same partition member as the partition member 32 of the aforesaid Embodiment 1 so as to provide the same construction as that of the third chamber 7 in the aforesaid Embodiment 1.

For example, as illustrated in FIG. 8, the second chamber 6 may have an air layer rather than providing the second adsorbent layer 23 in the second chamber 6. Further, as illustrated in FIG. 9, the second chamber 6 and the third chamber 7 may be combined into a single chamber 7A without dividing the chamber by the plate 5, and the interior of the chamber 7A may be divided into a first compartment 34, a second compartment 35, and a third compartment 36 by using the same partition member 32 as that in the aforesaid Embodiment 1. Further, the compartments 34, 35 and 36 may have the same interior constructions as those in the aforesaid Embodiment 1.

Further alternatively, the case may be provided with an atmospheric port and a single chamber in communication with the atmospheric port may be formed in the case, the interior of the chamber may be divided into a first compartment 34, a second compartment 35 and a third compartment 36 by using the same partition member as that in the aforesaid Embodiment 1, and the interiors of the compartments 34, 35 and 36 may have the same constructions as those in the aforesaid Embodiment 1 to constitute an evaporated fuel treating device. This evaporated fuel treating device may be used by disposing it in series with another evaporated fuel treating device.

The present Embodiment 2 also provides the same advantages as those of the aforesaid Embodiment 1.

Embodiment 3

In Embodiments 1 and 2 described above, the third chamber 7 has been formed such that its cross-section orthogonal to the axis X-X of the partition member 32 is rectangular, the contours of the separating walls 32b and 32c of the partition member 32 have been rectangular, the peripheral wall 32a has been shaped to be cylindrical, and the axis X-X of the peripheral wall 32a has been set to be substantially the same as the axis of the third chamber 7. However, the inner surface of the third chamber 7 may have any shape and the separating walls 32b and 32c of the partition member 32 may have contours matching the inner contour of the third chamber 7, as long as the third chamber 7 is in communication with the atmospheric port 31. Similarly, the peripheral wall 32a may have any shape as long as the first compartment 34 is formed on the inner side of the peripheral wall 32a, the second compartment 35 is formed between the peripheral wall 32a and the case 2, and the first communication portions 38 for the communication between the first compartment 34 and the second compartment 35 are provided.

Figure 10:
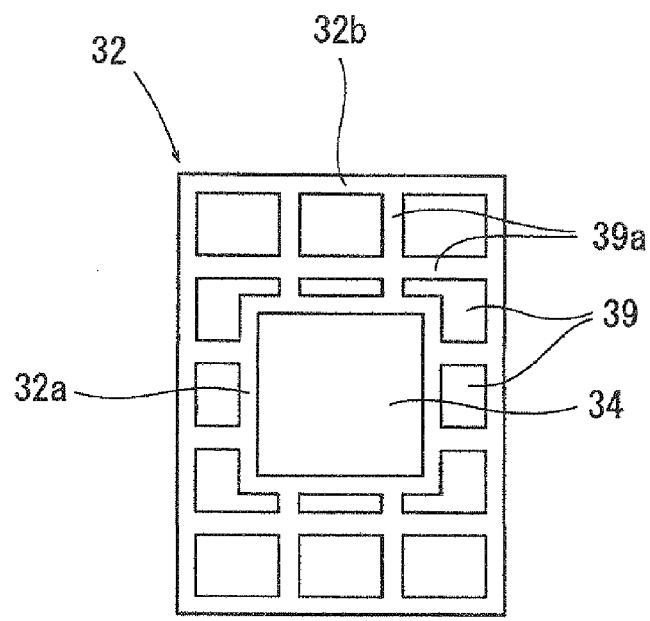
FIG. 10 is a top view illustrating an example of a partition member used in Embodiment 3 of the present invention.

For example, as illustrated in FIG. 10, the outer shapes of the separating walls 32b and 32c of the partition member 32 may be formed rectangular, and the peripheral wall 32a of the partition member 32 may have a rectangular cross-section orthogonal to the axis X-X, and the interior of the partition member 32 may be shaped like a hollow rectangular column.

Figure 11:
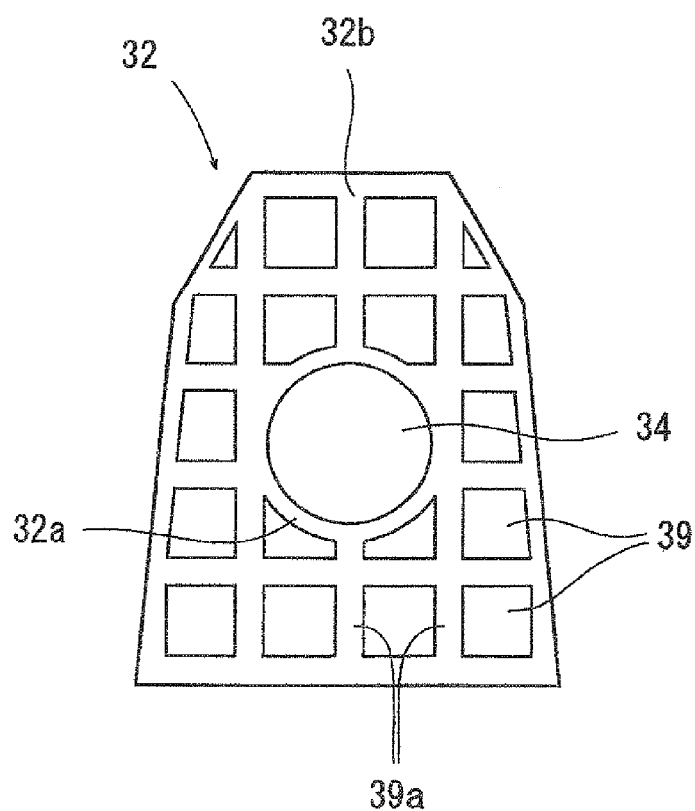
FIG. 11 is a top view illustrating another example of the partition member used in Embodiment 3 of the present invention.

The third chamber 7 may be formed to have a hexagonal cross-section that is orthogonal to the vertical axis. Further, as illustrated in FIG. 11, the first separating wall 32b and the second separating wall 32c may have hexagonal contours matching the inner surface shape of the third chamber such that the outer peripheries of the two separating walls 32b and 32c of the partition member 32 abut against the inner surface 7a of the third chamber 7.

Figure 12:
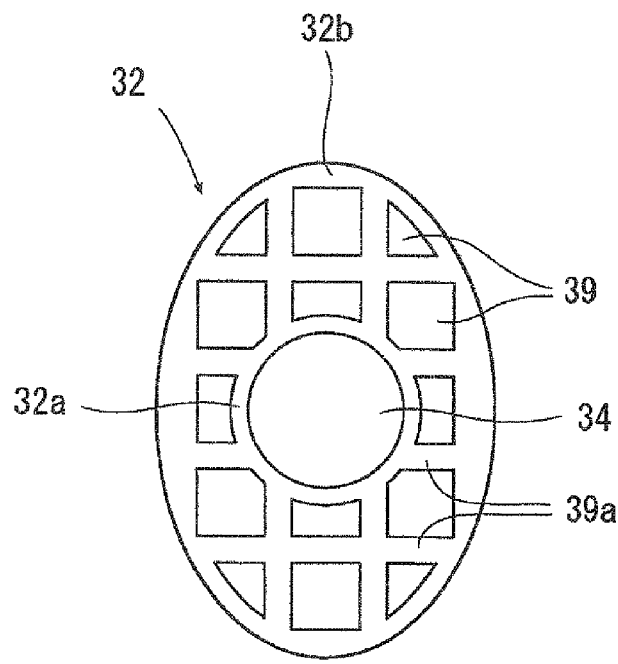
FIG. 12 is a top view illustrating still another example of the partition member used in Embodiment 3 of the present invention.

Further, the third chamber 7 may be formed to have an elliptical cross-section that is orthogonal to the vertical axis. Further, as illustrated in FIG. 12, the first separating wall 32b and the second separating wall 32c may have elliptical contours matching the inner surface shape of the third chamber such that the outer peripheries of the first separating wall 32b and the second separating wall 32c of the partition member 32 abut against the inner surface 7a of the third chamber 7.

In Embodiments 1 and 2 described above, the peripheral wall 32a has been formed such that the axis X-X is located substantially at the same position as that of the vertical central axis of the third chamber 7, as illustrated in FIGS. 1 to 5, 8 and 9. Alternatively, however, the peripheral wall 32a may be formed such that the axis X-X is eccentric relative to the vertical central axis of the third chamber 7 as long as the second compartment 35 is formed on the outer side of the peripheral wall 32a. In this construction, the axis X-X of the peripheral wall 32a is preferably set to be eccentric such that the space located under the peripheral wall 32a in the second compartment 35 is larger than the space located thereabove in the case where the evaporated fuel treating device 1 is disposed such that the atmospheric port 31 is oriented in the horizontal direction (laterally placed).

The present Embodiment 3 also provides the same advantages as those in the aforesaid Embodiment 1.

Further, if the evaporated fuel treating device is disposed such that the atmospheric port 31 is positioned in the horizontal direction and the axis X-X of the peripheral wall 32a is set to be eccentric such that the space located under the peripheral wall 32a in the second compartment 35 is larger than the space located thereabove, then the leakage of fuel components into the atmosphere can be reduced because, when the fuel components that have been adsorbed by the activated carbon desorb, the fuel components which are heavier than air settle out to the lower end of the peripheral wall 32a in the second compartment 35, thus making it possible to restrain the leakage into the atmospheric port 31.

Embodiment 4

In the aforesaid Embodiments 1 to 3, as illustrated in FIG. 6, the retaining member 45 has been formed to be cylindrical and a plurality of the through holes 46 has been formed at appropriate intervals in the side wall 45a. However, the retaining member may have any shape as long as it is capable of allowing a fluid to flow through the third adsorbent layer 40, the second compartment 35 and the third compartment 36 and also of holding the first filter 41 in position.

Figure 13:
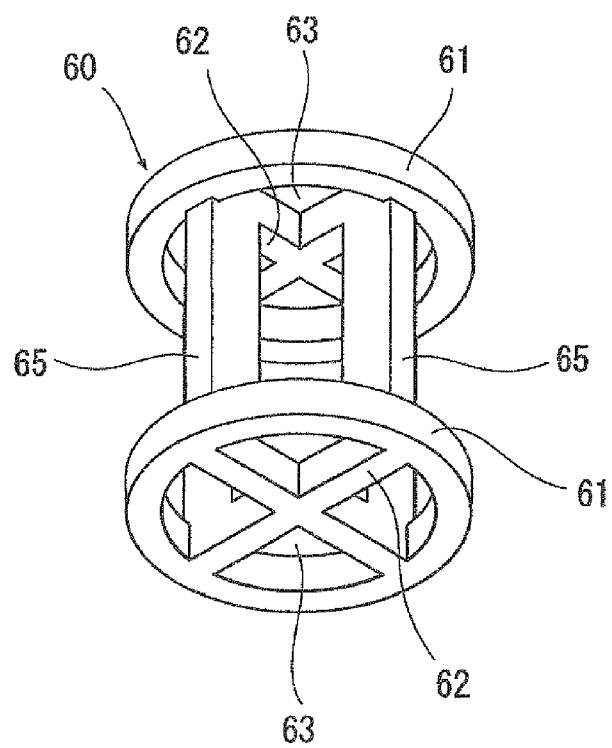
FIG. 13 is a perspective view illustrating an example of a retaining member used in Embodiment 4 of the present invention.
Figure 14A:
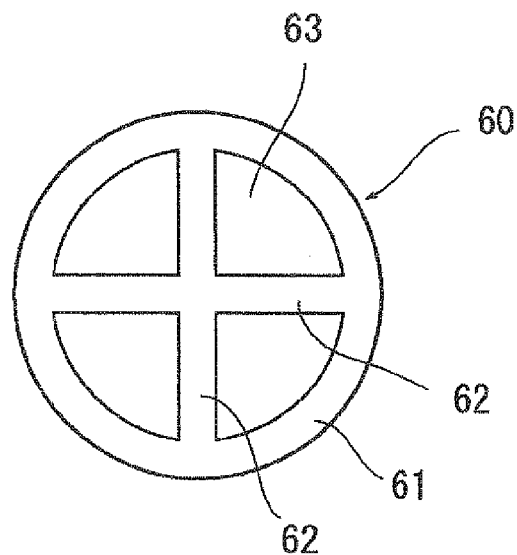
FIG. 14A is a top view of the retaining member shown in FIG. 13.
Figure 14B:
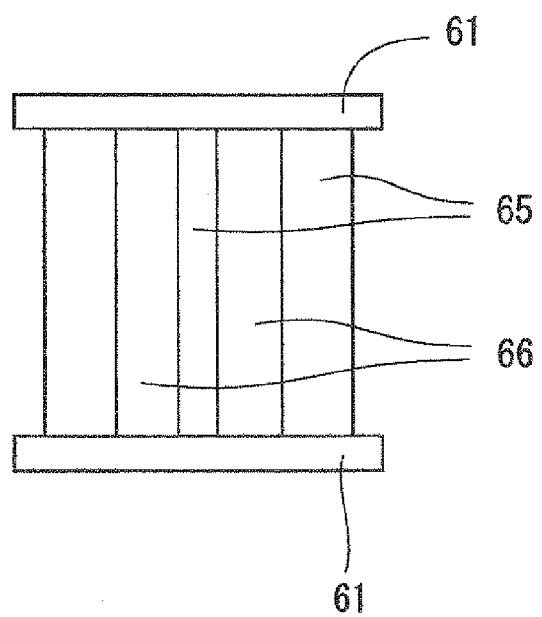
FIG. 14B is a front view of the retaining member shown in FIG. 13.

For example, a retaining member 60 illustrated in FIGS. 13, 14A and 14B may be used. The retaining member 60 has annular portions 61 and 61 that are formed into annular shapes at both ends thereof, as illustrated in FIG. 13, cross-shaped partitions 62 and 62 are provided in the annular portions 61 and 61, as illustrated in FIG. 14A, and through holes 63 are formed by the annular portions 61 and the partitions 62, as illustrated in FIG. 14B. Four side columns 65 are provided between the two partitions 62 and 62 at 90-degree intervals in the circumferential direction, forming spaces 66 thereamong.

The present Embodiment 4 provides the same advantages as those of the aforesaid Embodiment 1.

Embodiment 5

In the aforesaid Embodiments 1 to 3, the peripheral wall 32a of the partition member 32 has been formed to have the cross-section, which is orthogonal to the axis X-X, to retain substantially the same shape over its entire length in the direction of the axis X-X. Alternatively, however, the peripheral wall of the partition member may be formed such that the cross-section area thereof gradually reduces toward the atmospheric port 31 (one end) while the contour of the cross-section orthogonal to the axis X-X remaining the same. In other words, the diameter of the first compartment 34 (the inside diameter of the peripheral wall) may be formed such that it decreases toward one end while it increases toward the other end.

Figure 15:
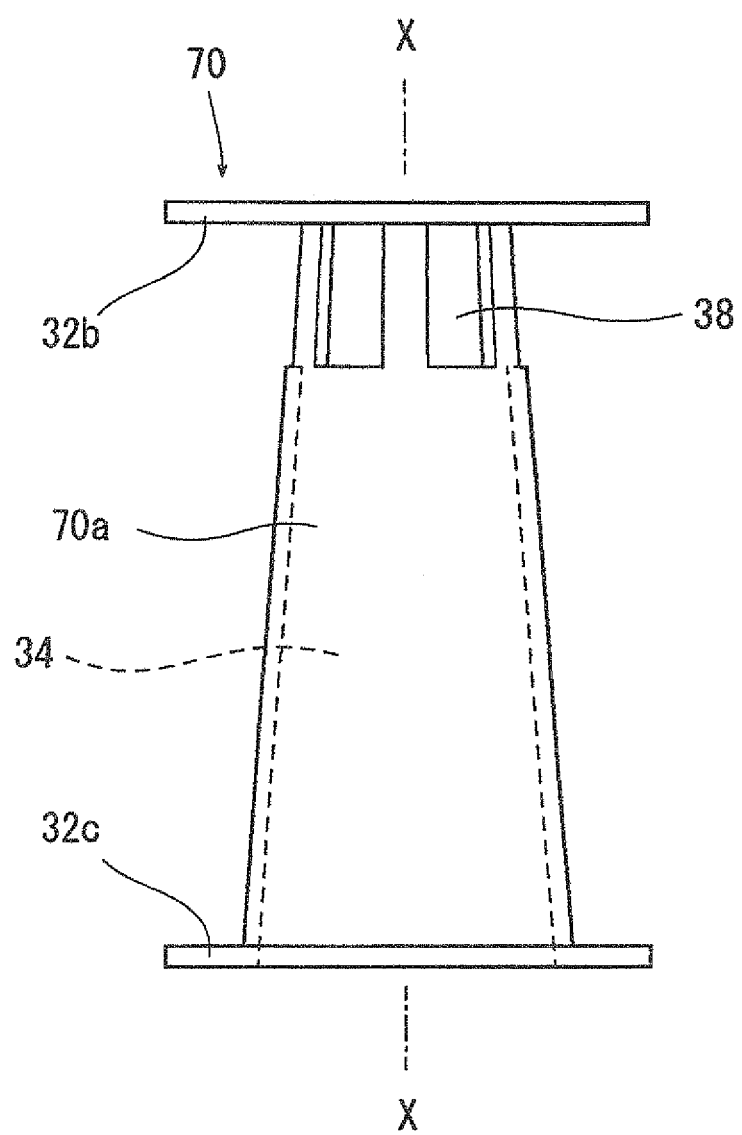
FIG. 15 is a front view illustrating an example of a partition member used in Embodiment 5 of the present invention.
Figure 16:
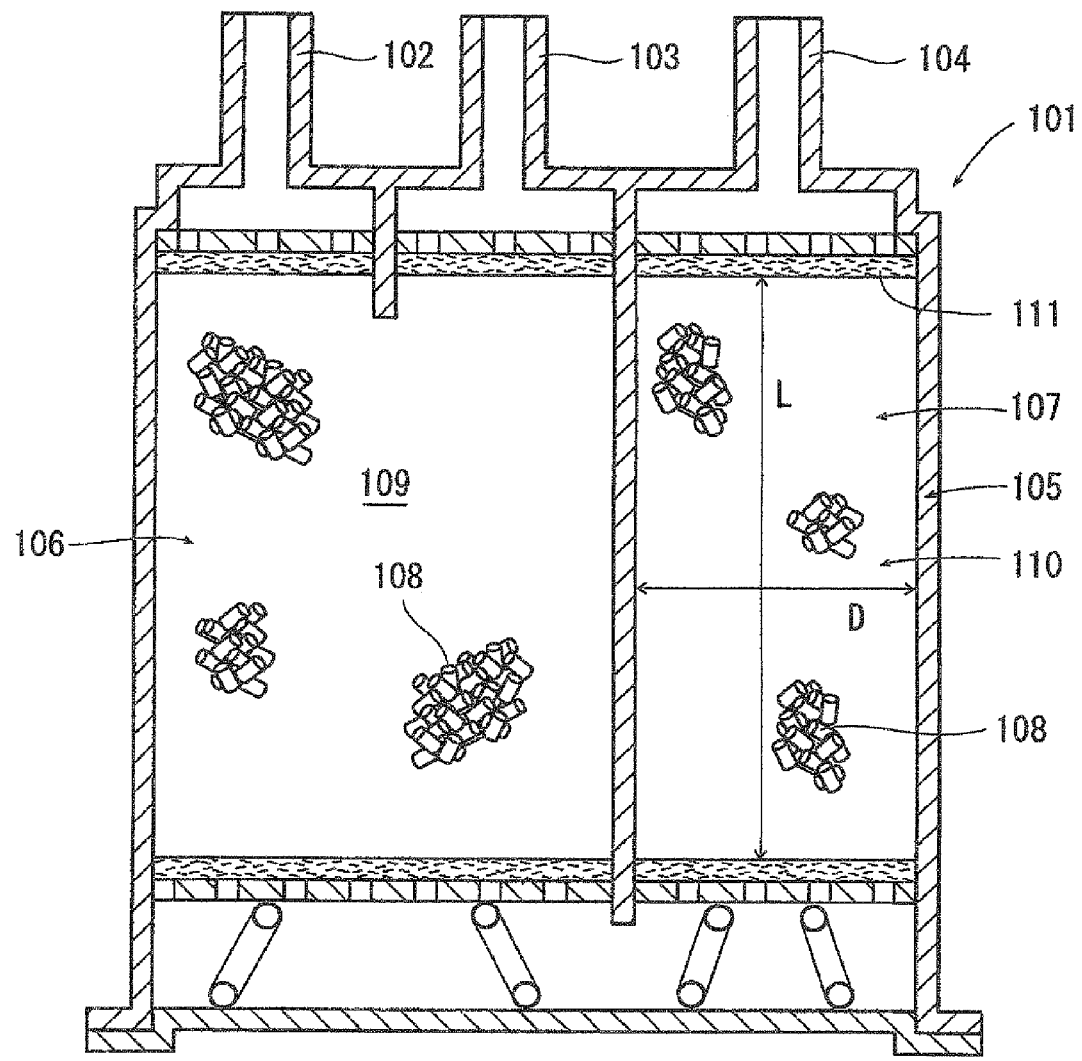
FIG. 16 is a diagram schematically illustrating a construction of an example of a conventional evaporated fuel treating device.
Figure 17:
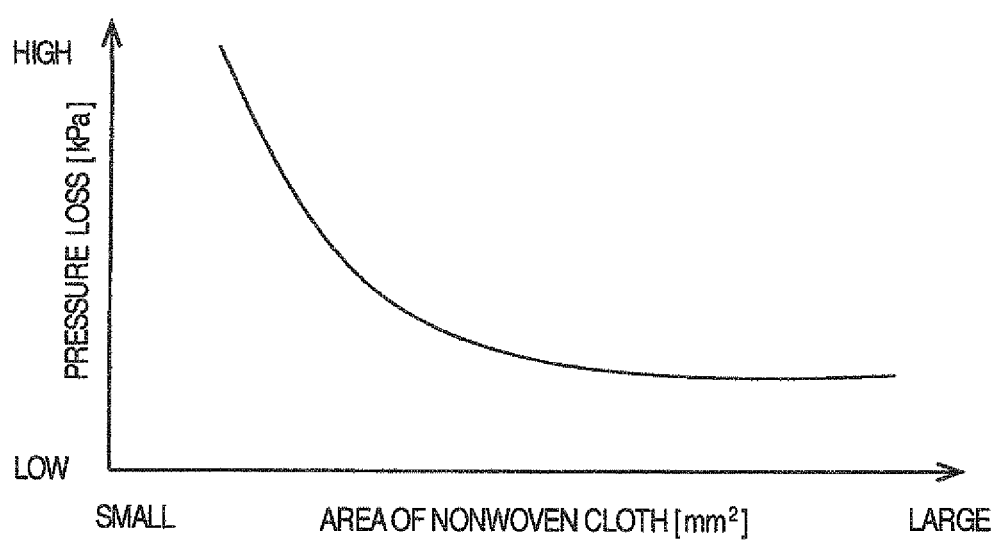
FIG. 17 is a graph illustrating a relationship between a surface area of a nonwoven cloth and a pressure loss observed when air is passed through the nonwoven cloth at a predetermined flow rate.

For example, as illustrated in FIG. 15, a peripheral wall 70a of a partition member 70 may be shaped like a truncated cone, the cross-section area of which gradually reduces toward the atmospheric port 31 (one end). A plurality of first communication portions 38, which are the same as those in the aforesaid Embodiment 1, is provided adjacently to the atmospheric port 31 in the peripheral wall 70a.

The present Embodiment 5 provides the same advantages as those of the aforesaid Embodiment 1.

Further, decreasing the cross-section area of the first compartment 34 toward the atmospheric port 31 (one end), i.e., decreasing the diameter of the first compartment 34 toward one end while increasing the diameter thereof toward the other end, makes it possible to increase the ratio L/D between the length L and the effective cross-section diameter D of the third adsorbent layer 40 in a portion thereof at its end adjacent to the atmospheric port 31. This permits a further reduction in the amount of an evaporated fuel emitted into the atmosphere.

The invention claimed is:

1. An evaporated fuel treating device comprising a case provided with an atmospheric port, said case having at least one partitioned chamber therein,
    wherein a chamber closest to said atmospheric port includes a partition member having a peripheral wall which serves as a partition to provide a first compartment on an inner side and a second compartment on an outer side and a separating wall which serves as a partition between said second compartment and a third compartment, said third compartment being formed between said separating wall and the atmospheric port;
    an adsorbent layer formed by filling adsorbent material is provided in said first compartment, one end of the first compartment being in communication with said third compartment, while the other end thereof being in communication with a tank port, thus allowing a fluid to flow across the first compartment through the adsorbent layer,
    said second compartment is in communication with the first compartment at a first communication portion formed in the peripheral wall adjacently to the atmospheric port, one end of the second compartment being in communication with the third compartment through a second communication portion provided in said separating wall, while the other end of the second compartment being closed, and a first filter covering an end of said adsorbent layer adjacent to the atmospheric port is installed, a second filter covering an end of said peripheral wall adjacent to the atmospheric port and an end of the separating wall adjacent to the atmospheric port being installed, and airflow resistance of said second filter being set to be higher than that of said first filter.

2. The evaporated fuel treating device according to claim 1, wherein a cross-section area of said first compartment is formed to become smaller toward an end thereof adjacent to the atmospheric port.

3. The evaporated fuel treating device according to claim 1, wherein side walls constituting said second communication portion are formed in a grid-like pattern.

4. The evaporated fuel treating device according to claim 2, wherein side walls constituting said second communication portion are formed in a grid-like pattern.

* * * * *